Nov. 8, 1949  J. C. SMILEY, JR  2,487,485
UNIVERSAL COUPLING
Filed July 18, 1945
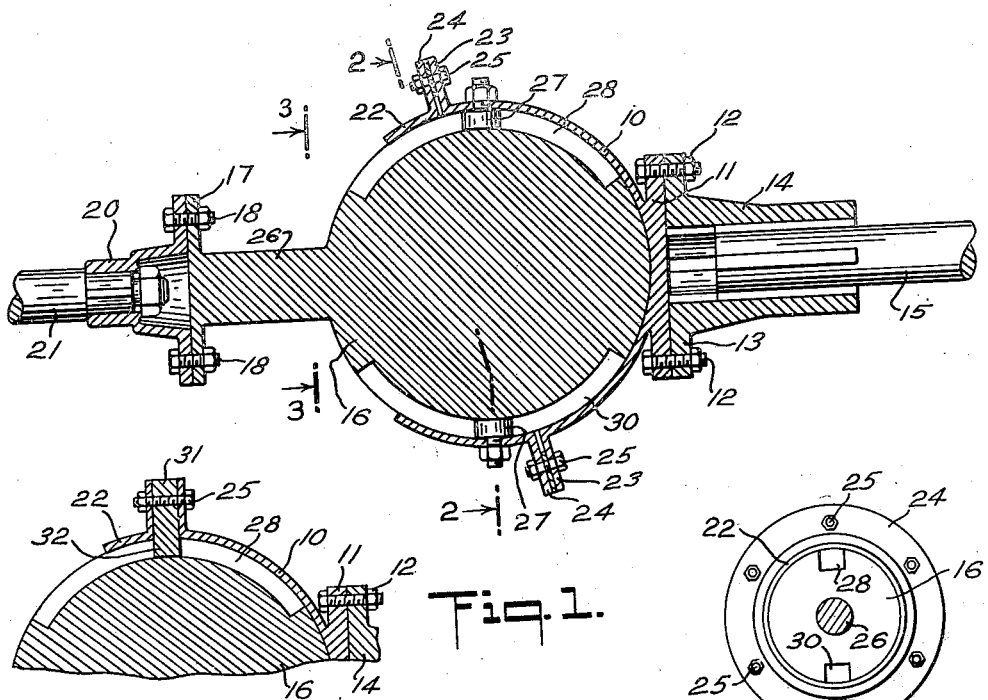
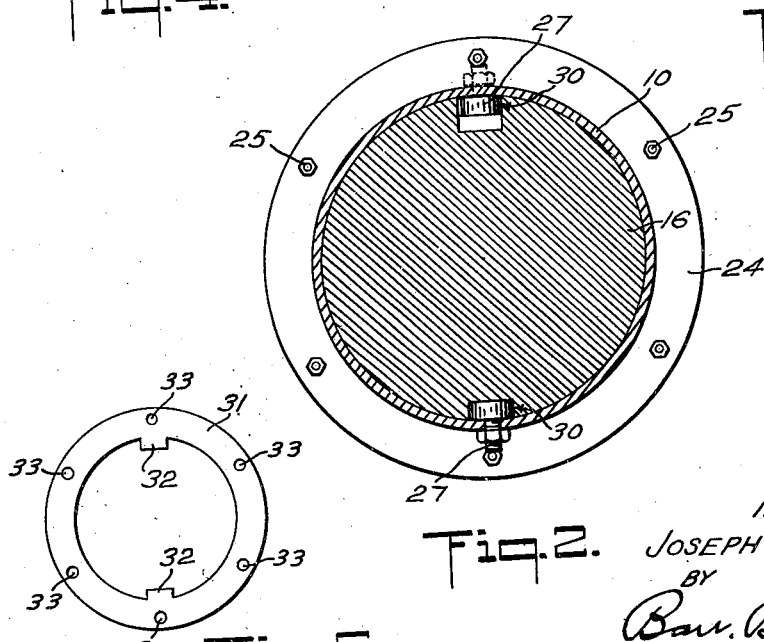
INVENTOR
JOSEPH C. SMILEY, JR.
BY
Barr, Borden & Fox
ATTORNEYS Patented Nov. 8, 1949

2,487,485

UNITED STATES PATENT OFFICE 2,487,485

UNIVERSAL COUPLING

Joseph C. Smiley, Jr., Philadelphia, Pa., assignor of two-fifths to Donald T. Wilson, Philadelphia, Pa.

Application July 18, 1945, Serial No. 605,729

1 Claim. (Cl. 64—7)

The present invention relates to couplings between a driving shaft and a driven shaft and more particularly to a coupling of the universal type.

In universal couplings as heretofore constructed, and especially those for use between the differential and the transmission of an automobile, certain misalinement movements create a binding tendency between the parts of the coupling which induces premature wear and damage to the parts. This binding action transmits a grinding noise to the gears and is inherent in present day automobile construction.

Some of the objects of the present invention are: to provide an improved universal joint or coupling; to provide a coupling of the universal type wherein means are provided to automatically relieve any tendency to bind while in use; to provide a universal coupling which is arranged to compensate for momentary misalinement of the two connected shafts whereby strain upon the gears is eliminated; to provide a universal coupling capable of long life and requiring a minimum of attention in use; to provide a universal coupling which is simple in construction, low in cost, and efficient in operation; and to provide other improvements as will hereinafter appear.

In the accompanying drawings, Fig. 1 represents a longitudinal section of a universal joint embodying one form of the present invention; Fig. 2 represents a section on line 2—2 of Fig. 1; and Fig. 3 represents a section on line 3—3 of Fig. 1, on a reduced scale; Fig. 4 represents a fragmentary transverse section of a modified form of the invention; and Fig. 5 represents a face elevation of the motion transmitting ring of Fig. 4.

Referring to the drawings, one form of the present invention comprises a socket member 10 formed as a portion of a sphere, such portion being greater than one-half of the diameter of that sphere. Attached to the member 10 is an end plate 11 which is apertured to receive fastening bolts 12 by which the member 10 is made fast to the flange 13 of a coupling 14 arranged to be keyed or otherwise secured to rotate with a driving shaft 15. This socket member 10 serves to receive and retain a ball 16 which is arranged to ride freely in contact with the inner wall of the socket member 10 and carries an end plate 17 which is apertured to receive bolts 18 for attachment to a coupling 20 arranged to be keyed or otherwise secured to transmit motion to a driven shaft 21.

In order to retain the ball 16 in place within the socket member 10 and also complete the bearing contact with the ball 16, a clamping ring 22 is provided having its inner face complemental to the ball surface for bearing contact therewith. The meeting ends of the socket member 10 and the ring 22 are provided respectively with circumferential apertured flanges 23 and 24 arranged in abutting relation and firmly joined by bolts 25. Thus, the socket member 10 and the ring 22 are held about and in contact with the ball while providing an annular clearance to permit unobstructed angular movement of the projecting shank 26 of the ball 16.

As a means for transmitting motion of the socket member 10 to the ball 16, two round headed pivot studs 27 are secured at diametrically opposite points to the socket member 10, and protrude inwardly thereof to respectively enter grooves 28 and 30 formed in the periphery of the ball 16, both being in the plane of the shank 26. These grooves are of such a length as to allow the pivot studs to slide one way or the other according to the direction of the undesirable thrust. The studs 27 have a relatively snug fit in the grooves in order to avoid lost rotational motion but are sufficiently free to move linearly of the grooves when required to prevent shocks from occurring due to sudden misalinement and which in prior known universal joints cause wear, damage, and annoying grinding of gears.

In operation with the coupling connected between the shafts 15 and 21, the rotation of the former will be transmitted directly to the socket member 10, which then, through the studs 27, causes the ball 16 and its driven shaft 21 to rotate in synchronism with the transmitted torque. Any misalinement of the two shafts in a horizontal plane results merely in turning the ball in the socket member about the pivot studs 27. Any misalinement of the two shafts in a vertical plane results in an angular tipping of the studs 27, since these latter are free to take a new position in the grooves 28 and 30. Any misalinement of the shafts at an angle between the vertical and horizontal produces a resultant force between the torque force and the misalined thrust which instead of binding the pivot studs is relieved by a movement of the studs along the grooves. In this way the damaging shock ordinarily present is eliminated and the coupling and the transmission gears are no longer subject to wear from this cause.

In the form of the invention shown in Figs. 4 and 5, the motion transmitting means comprises a ring 31 having two diametrically opposite inwardly projecting lugs 32 and bolt apertures 33. These lugs 32, in assembled condition of the coupling, enter the respective grooves 28 and 30 to perform the same function as do the heads 27 in the form shown in Figs. 1 to 3. In assembling the ring 31, it is properly located in abutting relation to the flange 23, whereupon the flanged clamping ring 22 is brought into place with its flange 24 abutting the ring 31. The bolts or studs 25 can now be tightened by passing through the alined holes and the sectional socket thus locked about the ball member 16.

Having thus described my invention, I claim:

A universal joint comprising a ball having two diametrically opposite grooves therein, a two part socket complementally shaped to receive said ball, each socket part having an outwardly disposed circumferential flange disposed substantially diametrically with respect to said ball but relatively out of contact to form a clearance, a ring having diametrically disposed lugs to respectively enter said grooves, said ring being disposed in said clearance between said socket flanges, and fastening devices clamping said socket flanges and said ring together.

JOSEPH C. SMILEY, Jr.

REFERENCES CITED

The following references are of record in the file of this patent:

UNITED STATES PATENTS

| Number | Name | Date |
|---|---|---|
| 277,176 | Vogel | May 8, 1883 |
| 760,894 | Mehlig | May 24, 1904 |
| 777,383 | Matson et al. | Dec. 13, 1904 |
| 794,247 | Palmer | July 11, 1905 |
| 1,021,924 | Fetzer | Apr. 2, 1912 |